June 28, 1966  M. N. ANDERSON  3,257,667
FACE-PROTECTING DEVICE
Filed Aug. 3, 1964
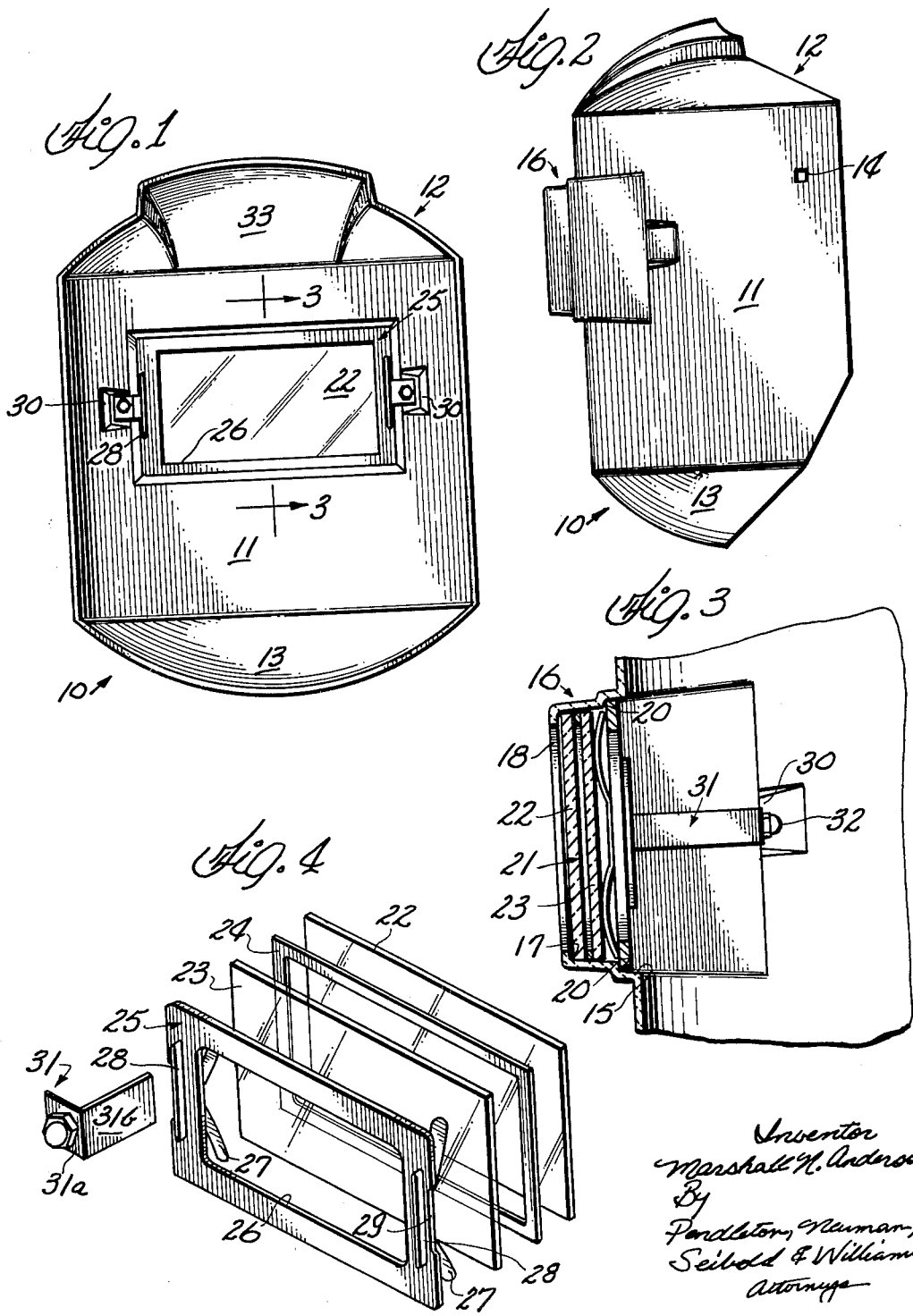

3,257,667
FACE-PROTECTING DEVICE
Marshall N. Anderson, Grayslake, Ill., assignor to Sellstrom Manufacturing Company, Palatine, Ill., a corporation of Illinois
Filed Aug. 3, 1964, Ser. No. 386,909
7 Claims. (Cl. 2—8)

This invention relates to a face-protecting device of a type utilized by welders and the like.

Various devices of this type have heretofore been produced; however, because of certain design characteristics, such devices have been beset with numerous shortcomings. For example, in many instances the viewing port formed in the shield of the device is restricted in size with the result that the vision of the wearer of the device is seriously impaired, particularly, when the wearer utilizes bifocal eyeglasses in combination with the device. Furthermore, in many prior devices, harmful light rays leak through the device, particularly in the vicinity of the viewing port, and thus seriously diminish the protection afforded by the device. In addition, assembling and/or disassembling of the lens unit with respect to the shield oftentimes is an awkward and frustrating operation.

Thus, it is an object of this invention to provide a face-protecting device which readily overcomes the aforementioned shortcomings of the prior devices.

It is a further object of this invention to provide a face-protecting device which is of simple, sturdy, yet lightweight construction and provides adequate protection for the wearer.

It is a still further object of this invention to provide a face-protecting device which affords good ventilation for the wearer.

Further and additional objects will appear from the description, accompanying drawings, and appended claims.

In accordance with one embodiment of this invention a face-protecting device is provided comprising a shield having an enlarged opening formed therein. Encompassing the opening and mounted on the outer, or exposed, surface of the shield is an outwardly projecting frame. The frame includes an outer shoulder, which delimits a viewing port, and an inner shoulder which is spaced inwardly (towards the face of the wearer) from the outer shoulder and is in substantially concentric relation therewith. The inner shoulder delimits an area greater than said viewing port. Disposed in overlying relation with respect to the viewing port and in contact with the outer shoulder is a removable lens unit. Engaging the inner shoulder of the frame is a masking element which delimits an opening aligned with said viewing port. The outer periphery of the masking element defines an area greater than the area delimited by the inner shoulder. Means are provided for releasably retaining the masking element in engagement with the inner shoulder of the frame.

For a more complete understanding of the invention reference should be made to the drawing wherein:

FIGURE 1 is a back elevational view of the improved face-protecting device.

FIG. 2 is a side elevational view of the device shown in FIG. 1.

FIG. 3 is an enlarged fragmentary sectional view taken along line 3—3 of FIG. 1.

FIG. 4 is an enlarged fragmentary exploded perspective view of the lens unit, masking element, and retaining means for the latter.

Referring now to the drawing, a face-protecting device 10 is shown. The illustrated embodiment is particularly adapted for use by welders, however, it is to be understood that the invention is not limited to such embodiment.

Device 10 in this instance includes a shield section 11 preferably curved to conform somewhat to the face of the wearer, a cover portion 12 extending upwardly and rearwardly from the top of said shield section, and a bottom portion 13 extending downwardly and rearwardly from the lower edge of the shield section. The shield section 11, cover portion 12, and bottom portion 13 are preferably molded as a unit from an opaque, plastic, lightweight, stiff material.

The device 10 is normally worn on the head of the person using such device. A pair of openings 14, one at each side of the shield 11, is provided to permit a headband, not shown, to be attached to the device. The manner of attaching such a headband and the type of headband used to position the device on the head of the wearer is well known in the art and constitutes no part of the instant invention.

When the device is in face-protecting position, the shield 11 is spaced forwardly of the wearer's face and extends around the sides of the wearer's head so as to cover the ears. The cover portion 12, on the other hand, overlies in spaced relation the forehead and top front portion of the head of the wearer. The bottom portion 13 is spaced from and subtends the chin of the wearer and also protects the neck of the wearer.

The shield 11 is provided with an enlarged opening 15 in the front thereof, see FIG. 3. Encompassing the opening 15 and mounted on and integral with the front, or exposed, surface of shield 11 is a frame 16. The frame projects outwardly from the shield and is provided with an outer shoulder 17 formed by an angularly disposed flange. The shoulder 17 delimits a viewing port 18 through which the wearer may observe his work.

Spaced inwardly from the outer shoulder 17, that is in a direction towards the face of the wearer, is an inner shoulder 20 which is arranged in concentric relation with respect to the outer shoulder. The inner shoulder 20 delimits an area greater than the area of viewing port 18.

Disposed between the outer and inner shoulders and in engagement with the former is a lens unit 21. The lens unit 21, as seen in FIGS. 3 and 4 comprises an outer pane 22 preferably formed of a transparent inflexible material, such as glass, and an inner pane 23 formed of a similar material but which has been tinted, or colored, so as to eliminate the transmission of harmful light rays to the eyes of the wearer, which are produced when contact is made between the welding rod and the workpiece. The size and shape of the panes forming the lens unit are the same.

The panes 22 and 23 are separated from one another by a gasket 24 formed of suitable material. The dimensions of the panes 22 and 23 and the gasket 24 will vary according to the size and shape of the viewing port 18. In certain instances the peripheral dimensions of the panes 22 and 23 may be either 2" x 4¼", or 3" x 5¼", or 4½" x 5¼". It is preferred, however, for optimum lateral and vertical vision without adversely affecting the overall weight of the device to use panes having a dimension of approximately 3" x 5¼". With plates of this size, a welder wearing bifocal or trifocal eyeglasses may utilize the device without having the lower peripheral segment of the viewing port 18 obstructing his normal vision.

Engaging the inner shoulder 20 of the frame 16 throughout its periphery is a masking element 25 which is preferably formed of a hard opaque plastic material. Element 25 delimits an elongated opening 26 which is approximately the same size and shape as, or slightly smaller than, the viewing port 18. The opening 26 and port 18 are in aligned relation when the masking element is in place against inner shoulder 20.

The outer periphery of element 25 defines an area greater than the area delimited by the inner shoulder 20. In the masking element, as illustrated, a pair of leaf springs 27 are mounted on the front surface of the element and disposed on either side of the opening 26 formed therein. When element 25 is in place, springs 27 resiliently contact marginal portions of pane 23, see FIG. 3.

Disposed on the rear surface of element 25 and intermediate the outer periphery of the element and the perimeter of opening 26 formed therein, are a pair of elongated ribs 28. The ribs are arranged in substantially parallel relation. The function of ribs 28 will be discussed more fully hereinafter.

The marginal portions 29 of element 25 adjacent ribs 28 are bevelled and recessed a slight amount so as to facilitate removal of the element 25, when desired, as will be explained more fully hereinafter.

Formed on the inner, or concealed, surface of shield 11, and disposed laterally with respect to, but inwardly from, the inner shoulder 20 of frame 16 is a pair of cavities 30. Each cavity is adapted to accommodate a substantially L-shaped spring 31, see FIGS. 3 and 4. The short leg 31a of the spring 31 is affixed to the base of the cavity by a rivet 32 or the like. The longer leg 31b of spring 31 extends angularly forward from cavity 30 and is adapted to engage the backside of element 25 in the vicinity of the bevelled segment 29. Ribs 28 restrict the deflection of the legs 31b toward opening 26. Thus, legs 31b serve to prevent inward movement (that is movement away from shoulder 20) of element 25, and thereby retain the periphery of element 25 in continuous contact with shoulder 20. Because of the positive and continuous contact between shoulder 21 and element 25 and the stepped relation between shoulder 17 and shoulder 20, leakage of harmful light rays around the periphery of element 25 is prevented.

To effect the disassembly of masking element 25 and lens unit 21, the longer leg 31b of one of the springs 31 is deflected away from the corresponding rib 28 until the distal end of leg 31b is positioned in the bevelled recessed segment 29 of the outer periphery of element 25. When the distal end of the leg 31b is aligned with the recessed portion 29, the masking element 25 may be pivoted about its opposite end until the end of the element clears the deflected spring leg 31b. Once element 25 is removed, the panes 22 and 23 and the gasket 24 may then be removed individually or as a unit.

To assemble the lens unit in the frame, pane 22, gasket 24, and pane 23 are placed in position as shown in FIG. 3 so that the marginal portion of pane 22 contacts shoulder 17. The masking element 25 is then pushed into place causing lateral outward deflection of spring legs 31a until they clear the rear surface of element 25, whereupon they will snap into position against ribs 28.

The cover portion 12 is provided with a central flue 33 which is recessed outwardly with respect to inner or concealed surface thereof. The flue 33 is spaced a greater distance from the forehead of the wearer than the inner surface of the remainder of the cover portion. By reason of the flue 33, air, which might otherwise become entrapped behind the shield, is readily circulated upwardly and out through the flue 33. Thus, fogging of the inner surface of pane 23 is eliminated and greater cooling comfort is afforded the wearer.

In certain types of work, where a face-protecting device is required, either the cover portion 12 or the bottom portion 13, or both may be eliminated. Furthermore, other types of retaining means than that shown can be utilized to hold the masking element or lens unit in place. In addition, while masking element 25 has been described as being preferably formed of hard opaque plastic material, it may, however, be die cast or die punched from sheet metal. Likewise, under certain circumstances, the shield section 11, cover portion 12, and bottom portion 13 may be formed of material other than that disclosed.

Thus, it will be seen that a face-protecting device has been provided which is of simple, sturdy, yet light weight construction and effectively blocks leakage of harmful light rays through the viewing port 18. Assembly and disassembly of the masking element and lens unit are greatly facilitated in the improved face-protecting device. In addition the improved device is provided with a viewing port which permits optimum lateral and vertical vision therethrough without the weight of the device being adversely affected. Better ventilation between the device and the face of the wearer is effected by the improved construction.

While a particular embodiment of this invention has heretofore been described, it is to be understood that the invention is not to be limited thereto, since many modifications may be made, and it is contemplated, therefore, by the appended claims to cover any such modifications as fall within the true spirit and scope of this invention.

I claim:

1. A face-protecting device comprising a shield having an outer surface and an inner surface and provided with an enlarged opening; a frame mounted on and protruding outwardly from the outer surface of said shield and in registered relation with said opening, said frame having a continuous imperforate periphery and being provided with an outer shoulder delimiting a viewing port and an inner shoulder spaced inwardly from said outer shoulder and in substantially concentric relation therewith, said inner shoulder delimiting an area greater than said viewing port; a lens unit overlying said port and engaging said outer shoulder; a masking element in positive engagement throughout with said inner shoulder, said masking element delimiting an opening aligned with said viewing port, the outer periphery of said masking element defining an area greater than the area delimited by said inner shoulder; and means releasably engaging opposed end portions of said masking element for retaining said masking element in engagement with said inner shoulder.

2. The face-protecting device recited in claim 1 wherein the area of the viewing port is in the range of from about 8.0 square inches to about 23.5 square inches.

3. The face-protecting device recited in claim 1 including a cover portion integral with and extending upwardly and rearwardly from the upper portion of said shield; said cover portion having an inner surface provided with an elongated recessed flue extending from the inner surface of said shield to the uppermost rearward segment of said cover portion.

4. A face-protecting device comprising a shield having an outer surface and an inner surface adjacent to but spaced from the face of a wearer, said shield being provided with an enlarged opening; a frame integral with and protruding outwardly from the outer surface of said shield and in registered relation with said opening, said frame having a continuous imperforate periphery and being provided with an outer shoulder delimiting a viewing port and an inner shoulder spaced inwardly from said outer shoulder and in substantially concentric relation therewith, said inner shoulder delimiting an area greater than said vewing port; a lens unit overlying said port and engaging said outer shoulder, said lens unit including an outer pane of substantially inflexible, transparent material, an inner pane of like configuration and formed of substantially inflexible, tinted, transparent material, and a gasket disposed intermediate said panes and engaging corresponding peripheral portions thereof; a masking element in positive engagement throughout with said inner shoulder, said masking element delimiting an opening aligned with said viewing port, the outer periphery of said masking element defining an area greater than the area delimited by said inner shoulder; biasing means for retaining said lens unit in engagement with said outer shoulder; and means carried by said shield and releasably engaging opposed end portions of said masking element for retaining same in engagement with said inner shoulder.

5. A face-protecting device comprising a shield having an outer surface and an inner surface and provided with an enlarged opening; a frame mounted on and protruding outwardly from the outer surface of said shield and in registered relation with said opening, a lens unit mounted in said frame, a masking element having a portion thereof resiliently engaging a rear peripheral surface portion of said lens unit, said masking element having a recess in an edge portion thereof, rearwardly protruding rib means mounted on the rear surface of said masking element adjacent said recess; and masking element retaining means mounted on the inner surface of said shield; said retaining means having an adjustable section, adapted when in one position of adjustment to engage said rib means, and prevent independent rearward movement of said masking element and, when in a second position of adjustment, to be aligned with said recess whereby said masking element may be independently moved rearwardly.

6. The device of claim 5 in which a portion of said mask delimiting said recess is beveled rearwardly.

7. The device of claim 5 in which said masking element includes spring means attached to the front surface thereof, said spring means being adapted to engage adjacent surface portions of said lens unit when said masking element is restrained from rearward movement by said masking element retaining means.

References Cited by the Examiner
UNITED STATES PATENTS

| | | | |
|---|---|---|---|
| 1,885,426 | 11/1932 | Flood | 2—8 |
| 1,905,210 | 4/1933 | Bowers | 2—8 |
| 2,263,116 | 11/1941 | Andrews | 2—8 |
| 2,416,764 | 3/1947 | Madson | 2—8 |
| 3,103,667 | 9/1963 | Rogowski | 2—9 |
| 3,112,490 | 12/1963 | Malcom | 2—8 |

JORDAN FRANKLIN, *Primary Examiner.*

J. R. BOLER, *Assistant Examiner.*